US007222979B1

(12) United States Patent
Popowich et al.

(10) Patent No.: US 7,222,979 B1
(45) Date of Patent: May 29, 2007

(54) ILLUMINATED DIAL

(75) Inventors: David J. Popowich, Brampton (CA); Simon Treadwell, Toronto (CA); Kerwyn Prescod, Angus (CA); Christopher J. Reis, Brampton (CA)

(73) Assignee: CFM Corporation, Mississauga, Ontario (CA)

( * ) Notice: Subject to any disclaimer, the term of this patent is extended or adjusted under 35 U.S.C. 154(b) by 0 days.

(21) Appl. No.: 11/270,117

(22) Filed: Nov. 9, 2005

(51) Int. Cl.
*G01D 11/16* (2006.01)

(52) U.S. Cl. ........................................ 362/26; 200/316

(58) Field of Classification Search .................. 362/26; 200/316
See application file for complete search history.

(56) References Cited

U.S. PATENT DOCUMENTS

| | | | |
|---|---|---|---|
| 2,109,790 | A | 3/1938 | Batcheller |
| 2,519,329 | A | 8/1950 | Woodward |
| 2,648,305 | A | 8/1953 | Appleman |
| 2,693,165 | A | 11/1954 | Appleman |
| 2,699,141 | A | 1/1955 | Gaguski |
| 2,711,711 | A | 6/1955 | Harman |
| 2,744,185 | A | 5/1956 | Cawley |
| 2,953,668 | A | 9/1960 | Bassett |
| 3,198,923 | A | 8/1965 | Tripp |
| 3,254,534 | A | 6/1966 | Graham |
| 3,320,393 | A | 5/1967 | Sohns |
| 4,163,883 | A | 8/1979 | Boulanger |
| 4,176,265 | A | 11/1979 | Mobus |
| 4,221,945 | A | 9/1980 | Mobus |
| 4,264,799 | A | 4/1981 | Aspden |
| 4,441,480 | A | 4/1984 | Rickman |
| 4,549,050 | A | 10/1985 | Lang |
| 4,677,964 | A | 7/1987 | Lohmeyer |
| 4,743,736 | A | 5/1988 | Albinger |
| 4,777,927 | A | 10/1988 | Stephen |
| 4,966,125 | A | 10/1990 | Stephen |
| 5,003,960 | A | 4/1991 | Hanagan |
| 5,033,449 | A | 7/1991 | Hanagan |
| 5,093,764 | A | 3/1992 | Hasegawa |
| 5,180,050 | A | 1/1993 | Rada |
| 5,204,502 | A | 4/1993 | Ferris |
| 5,335,148 | A | 8/1994 | Tominaga |
| 5,359,165 | A | 10/1994 | Leveque |
| 5,464,955 | A | 11/1995 | Cole |
| 5,491,314 | A | 2/1996 | Dorsey |
| 5,510,782 | A | 4/1996 | Norris |
| 5,628,242 | A | 5/1997 | Higley |
| 5,669,485 | A | 9/1997 | Painter |
| 5,708,428 | A | 1/1998 | Phillips |
| 5,718,326 | A | 2/1998 | Larose |

(Continued)

*Primary Examiner*—Ali Alavi
*Assistant Examiner*—Hargobind S. Sawhney
(74) *Attorney, Agent, or Firm*—McDonnell Boehnen Hulbert & Berghoff LLP

(57) ABSTRACT

An illuminated knob assembly includes a base. The base includes an annular track on an upper base surface of the base. A PC board is disposed in the track. The PC board includes a plurality of light sources disposed on an upper board surface of the board. A light transmitting plate is positioned over the PC board so as to transmit light therethrough from the light sources. A bezel is fitted over the light transmitting plate and includes gradated openings corresponding to different conditions of operation. The openings permit light to pass therethrough from the light transmitting plate and a knob is disposed adjacent the bezel. The knob includes a light pointer configured to receive and transmit light from the light transmitting plate.

19 Claims, 7 Drawing Sheets

U.S. PATENT DOCUMENTS

| | | | | |
|---|---|---|---|---|
| 5,802,958 | A | 9/1998 | Hermansson | |
| 5,844,203 | A | 12/1998 | Chasen | |
| 5,861,589 | A * | 1/1999 | Sato et al. | 200/5 R |
| 5,901,835 | A | 5/1999 | Hung | |
| 5,901,836 | A | 5/1999 | Taniuchi | |
| 5,905,238 | A | 5/1999 | Hung | |
| 5,913,414 | A | 6/1999 | Pollock | |
| 5,927,184 | A | 7/1999 | Hermansson | |
| 5,934,182 | A | 8/1999 | Harter | |
| 5,951,349 | A | 9/1999 | Larose | |
| 6,013,885 | A * | 1/2000 | Kowalczyk | 200/315 |
| 6,019,478 | A | 2/2000 | Pizzo | |
| 6,064,042 | A | 5/2000 | Glucksman | |
| 6,176,589 | B1 | 1/2001 | Ishiguro | |
| 6,178,916 | B1 | 1/2001 | Snider | |
| 6,207,913 | B1 * | 3/2001 | Nakajima et al. | 200/314 |
| 6,213,614 | B1 | 4/2001 | Gjerde | |
| 6,224,221 | B1 | 5/2001 | Glienicke | |
| 6,326,569 | B1 | 12/2001 | Ardrey | |
| 6,392,175 | B1 | 5/2002 | Bauer | |
| 6,420,667 | B1 | 7/2002 | Miwa | |
| 6,425,319 | B1 | 7/2002 | Wu | |
| 6,512,189 | B1 | 1/2003 | Schuberth | |
| 6,531,952 | B1 * | 3/2003 | Meyer et al. | 338/172 |
| 6,542,353 | B2 | 4/2003 | Ardrey | |
| 6,555,770 | B2 | 4/2003 | Kawase | |
| 6,571,727 | B2 | 6/2003 | Gjerde | |
| 6,595,653 | B2 | 7/2003 | Saito | |
| 6,608,272 | B2 | 8/2003 | Garcia | |
| 6,615,706 | B1 | 9/2003 | Wu | |
| 6,624,368 | B2 | 9/2003 | Sato | |
| 6,627,829 | B2 | 9/2003 | Sato | |
| 6,663,251 | B2 | 12/2003 | Calvert | |
| 6,685,327 | B2 | 2/2004 | Dorrie | |
| 6,733,146 | B1 | 5/2004 | Vastano | |
| 6,767,104 | B2 | 7/2004 | Worrell | |
| 7,005,596 | B2 * | 2/2006 | Maeda et al. | 200/314 |
| 7,041,922 | B2 * | 5/2006 | Geiger et al. | 200/296 |
| 2005/0067268 | A1 * | 3/2005 | Hurrle | 200/314 |

* cited by examiner

ILLUMINATED DIAL

FIELD OF THE INVENTION

The present invention relates to systems and methods for providing illumination. More particularly, the present invention is directed to lighting systems and methods for providing illumination to a control mechanism, and in particular, to a dial for a barbeque or grill.

BACKGROUND OF THE INVENTION

Presently, about 80% of families in the United States own and use a barbeque, also known as a grill. While once only a summertime activity confined to the daytime, barbequing is now done throughout the year, in all weather, and even after sunset. So they may be used even when ambient light is low or largely non-existent, many different types of apparatus and system in order to provide illumination to barbecues.

Some of the known lighting systems attach to or around the lids of the barbeque or are intended to be positioned on or around the barbeque. These known systems take up valuable space of the barbeque work surface and are vulnerable to physical damage during use of the barbeque. For example, one such lighting system includes a gooseneck-mounted lamp that is attachable to the barbeque by a clamp.

An important aspect of operating a barbeque grill is modulating the amount of heat generated at one or more cooking surfaces or areas of the barbeque. This is typically accomplished through the adjustment of one or more controls. The control is typically a knob, lever or a suitable hand control mechanism. In a gas grill, the control is attached to a valve that controls the flow of fuel, typically propane, delivered to burners underneath the cooking surface or surfaces. For example, during initial lighting of a gas barbeque grill the one or more control knob is typically turned to a position that permits full flow of fuel to the one or more burners to light them. After lighting, the flow of fuel is typically reduced to heat the grill to and maintain an optimal cooking temperature. After the desired temperature is reached, the flow of fuel may be further reduced to prevent overheating or burning of the food.

Despite the importance of the operation of the controls of a barbeque, the front vertical face of known barbeque grills are poorly illuminated. Known lighting systems throw light above but not generally perpendicular to the control panel. As a result, the controls are only partially lit while portions of the controls and control panel are in the shadow cast by the lights or not illuminated at all.

In a low light condition, it can be difficult to detect the setting of the control knob (or knobs where there are several individually controlled burners) or correlate a setting of the knob to a temperature of the grill.

Accordingly, there is a demand therefore for a simple, safe, and effective assembly that provides illumination to a control knob or control panel of a barbeque grill or any other application where illumination is needed of a control knob. The present invention satisfies the demand.

SUMMARY OF THE INVENTION

The present invention has a principal objective of providing illumination to at least one control knob. For purposes of this application, the control knob will mean a single control knob or a plurality control knobs that may be arranged as a control panel. The invention is useful in a variety of applications including to provide illumination to an otherwise conventional barbeque having at least one control knob.

One embodiment of the present invention provides an illuminated control knob or dial which includes a base. The base includes an annular track on an upper base surface of the base. A PC board is disposed in the track. The PC board includes a plurality of light sources disposed on an upper board surface of the board. A light transmitting plate is positioned over the PC board so as to transmit light therethrough from the light sources. A bezel is fitted over the light transmitting plate and includes gradated openings corresponding to different conditions of operation. The openings permit light to pass therethrough from the light transmitting plate and a knob is disposed adjacent the bezel. The knob includes a light pointer configured to receive and transmit light from the light transmitting plate.

These and other advantages, as well as the invention itself, will become apparent in the details of construction and operation as more fully described and claimed below. Moreover, it should be appreciated that several aspects of the invention can be used in other applications where illumination of a work surface or operation area would be desirable.

DETAILED DESCRIPTION OF A PRESENTLY PREFERRED EMBODIMENT

Figure 1:
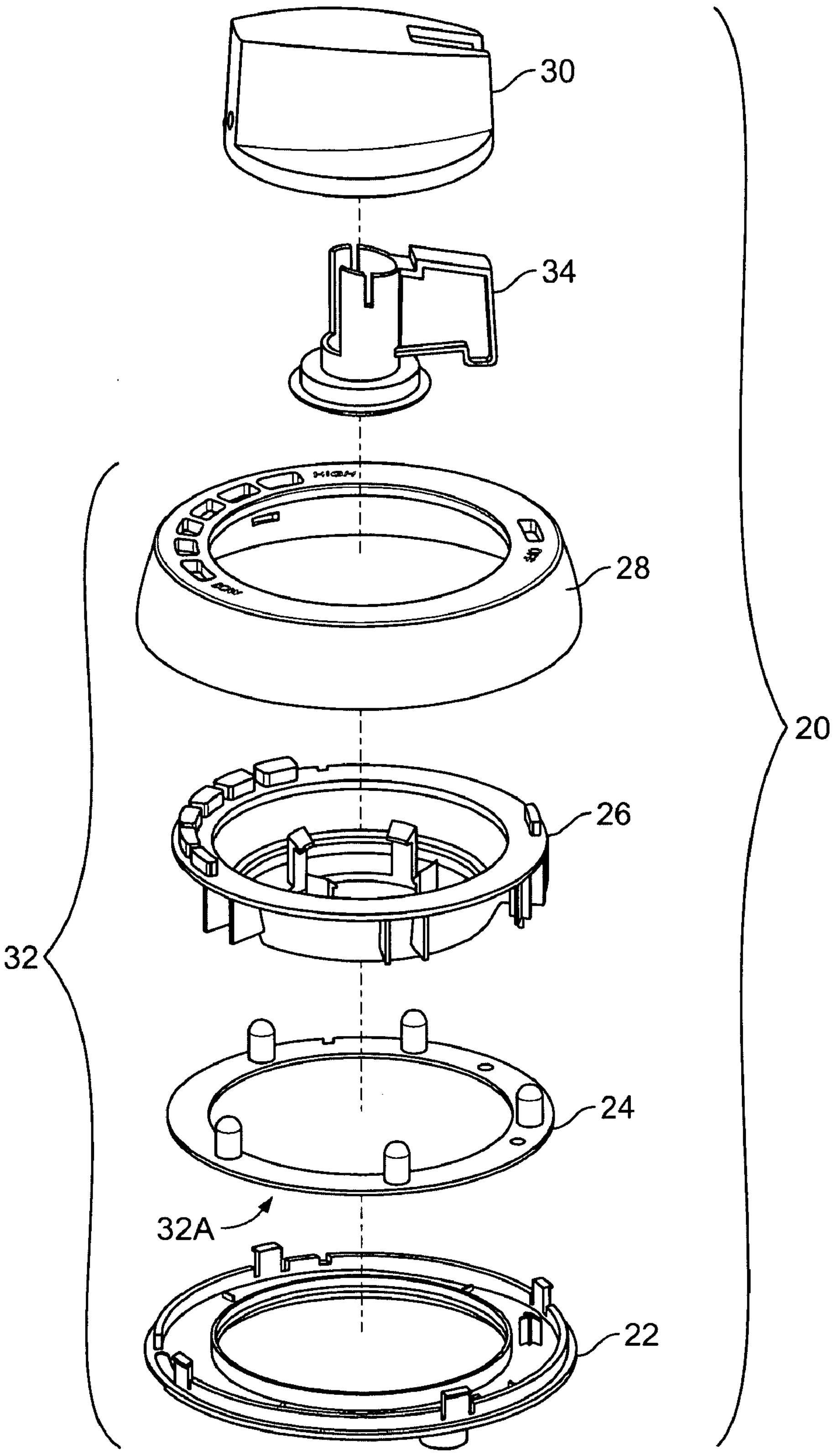
FIG. 1 illustrates an exploded view of an illuminated control knob assembly according to one embodiment of the present invention.

An illuminated control knob assembly according to the present invention is identified in the accompanying drawings at 20. The assembly 20, in the illustrated embodiments, includes six main parts, which of course, may be combined or rearranged, as is known in the art, to make more or less than six parts. The parts of the illustrated embodiment include a base 22, which is sized and shaped to receive a printed circuit ("PC") board 24. The base 22 and PC board 24 are sized and shaped to receive a light-transmitting plate 26. The combined base 22, PC board 24 and light-transmitting plate 26 cooperate so that they may fasten to a bezel 28 and thereby form a dial 32. A knob 30, which may include a light-transmitting pointer 34, may be sized and shaped to fit within the dial 32. How each above part is configured, fits with the other parts and how each functions will be shown in more detail in FIGS. 2–10 and discussed below.

Figure 2:
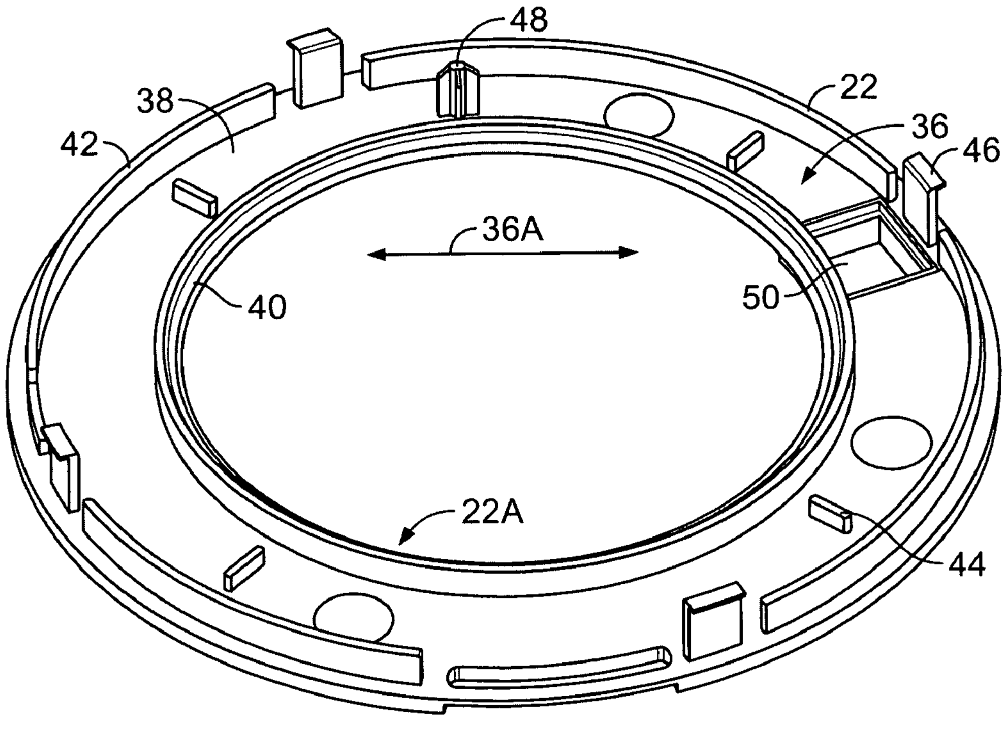
FIG. 2 illustrates a top perspective view of a base of the illuminated control knob of FIG. 1.

The base or base plate 22, in the embodiment illustrated in FIGS. 1 and 2 is sized and shaped in the form of a flat ring 22A. The base plate 22 includes an upper surface 36, defining a track 38, which is bordered by an inner wall 40 and an outer wall 42. Both of the inner wall 40 and outer wall 42 are generally perpendicular to the plane 36A in which the upper surface 36 lies and generally parallel to each other so they extend in the same upwardly direction. A plurality of raised stand off elements 44 are spaced about the track 38. The stand off elements 44 function to generally separate the base 22 from the PC board 24.

Interleaved with segments of the outer wall 42 is a plurality of base hooks 46. The base hooks 46 are outward facing hooks which function to fasten the base 22 to the bezel 28. The track 38 also includes a base alignment pin 48, which serves to cooperate with and orient the PC board 24 in a correct configuration. The track 38 further includes an access port 50 that provides access to the interior 32A of the dial 32 when fully assembled, by electrical wiring, a loom or plug, etc. (not shown).

Figure 3:
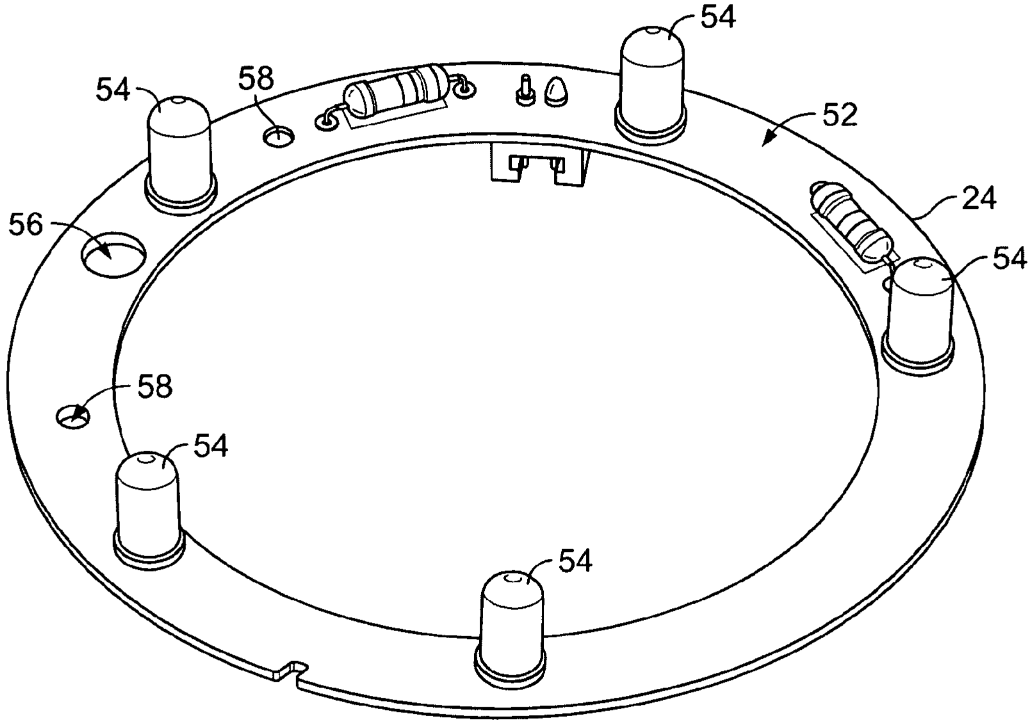
FIG. 3 illustrates a top perspective view of a PC board with light source portion of the illuminated control knob of FIG. 1.
Figure 4:
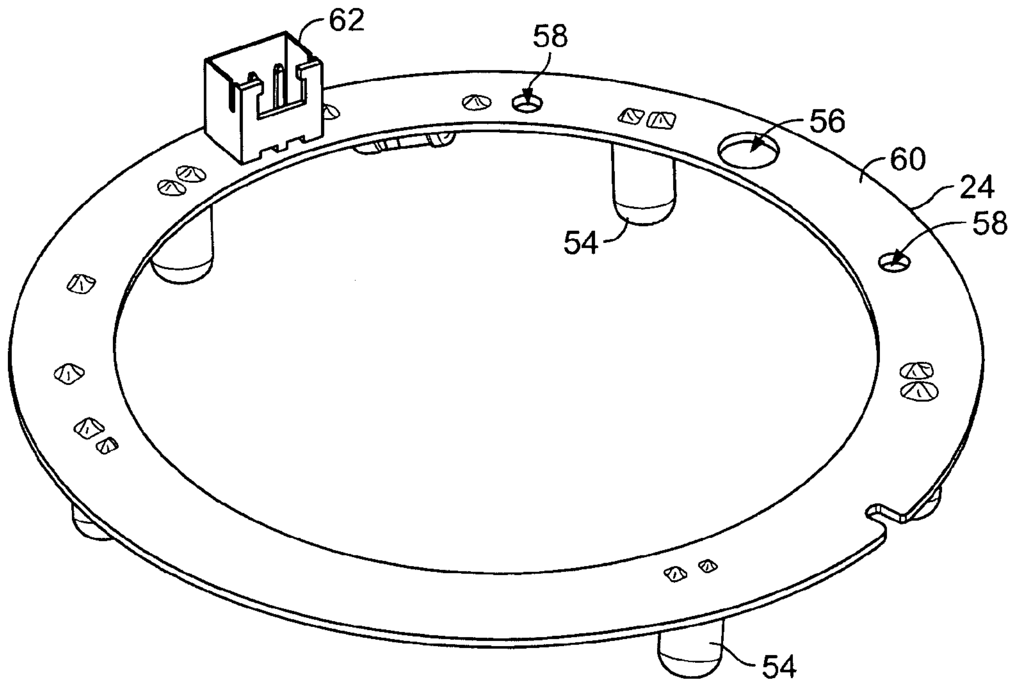
FIG. 4 illustrates a bottom perspective view of the PC board of FIG. 3.

FIGS. 1, 3 and 4 show a PC board 24, which is in the form of a flattened ring to cooperate and fit with track 38 of the base 22 (see FIG. 2). The PC board 24 includes an upper surface 52 about which a plurality of light sources, 54 e.g., light-emitting diodes 54, may be spaced about the upper surface 52.

A base alignment opening 56 is formed through the PC board 24. The base alignment opening 56 cooperates with the base alignment pin 48 of the base 22 to position the PC board 24 on the base 22. A pair of spaced cap alignment holes 58 may be formed though the PC board 24 which function to align the light-transmitting plate 26 on the PC board.

FIG. 4 shows a bottom view and the bottom surface 60 of the PC board 24. The bottom surface 60 includes a socket 62, which functions to receive an electrical connection to supply electricity (battery, A/C, solar, etc.) to one or more of the light sources 54 such as the one or more LEDs 54 on the top surface 52.

Figure 5:
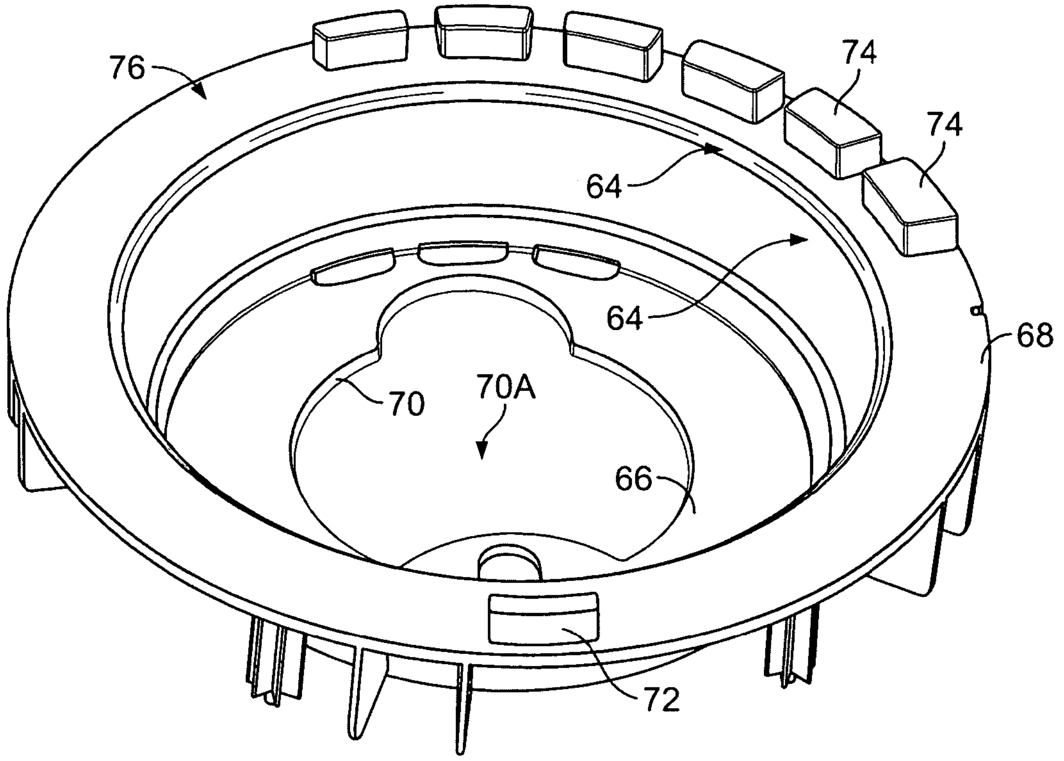
FIG. 5 illustrates a top perspective view of a light-transmitting plate portion of the illuminated control knob of FIG. 1.

FIG. 5 shows the light transmitting plate 26 in greater detail. In a preferred embodiment, the plate 26 is made entirely of a light transmitting material, such as a clear or more preferably translucent plastic. Of course, the plate 26 may be made of only some transparent or translucent material. The plate 26 may be a cylindrical body with a sidewall 64. The sidewall 64 includes an inwardly extending first flange 66 at a lower edge thereof and an outwardly extending second flange 68 at a top edge thereof. Preferably, the material of the light transmitting plate 26 is colored to enhance visibility thereof.

The inner or first flange 66 includes at least a central wall 70 that forms a central opening 70A therethrough. The outer or second flange 68 includes a plate top surface 76 including a single protrusion 72 at a first position and a set of graduated protrusions 74. As will be shown below in more detail, the single protrusion 72 can be positioned through the bezel 28 to point to, identify or indicate one position such as an "off" position (that is, gas valve closed). The set of graduated protrusions 74 may be positioned through the bezel 28 at positions corresponding to varying rates of gas flow, i.e., low, medium and high, and so on.

Figure 6:
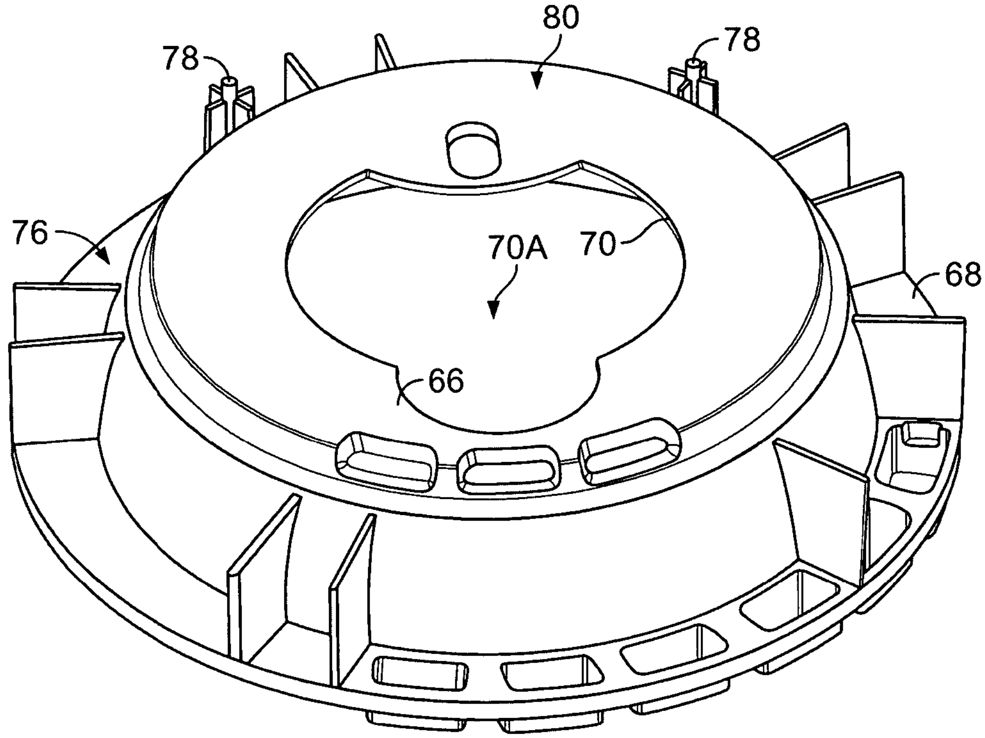
FIG. 6 illustrates a bottom perspective view of the light-transmitting plate of FIG. 5.

FIG. 6, shows an underside 80 of the plate 26 and the central opening 70A formed in the inner flange 66. A pair of plate alignment pins 78 is provided, which extends from the outer flange 68 to cooperate with the alignment holes 58 of the PC board 24 (see FIG. 3).

Figure 7:
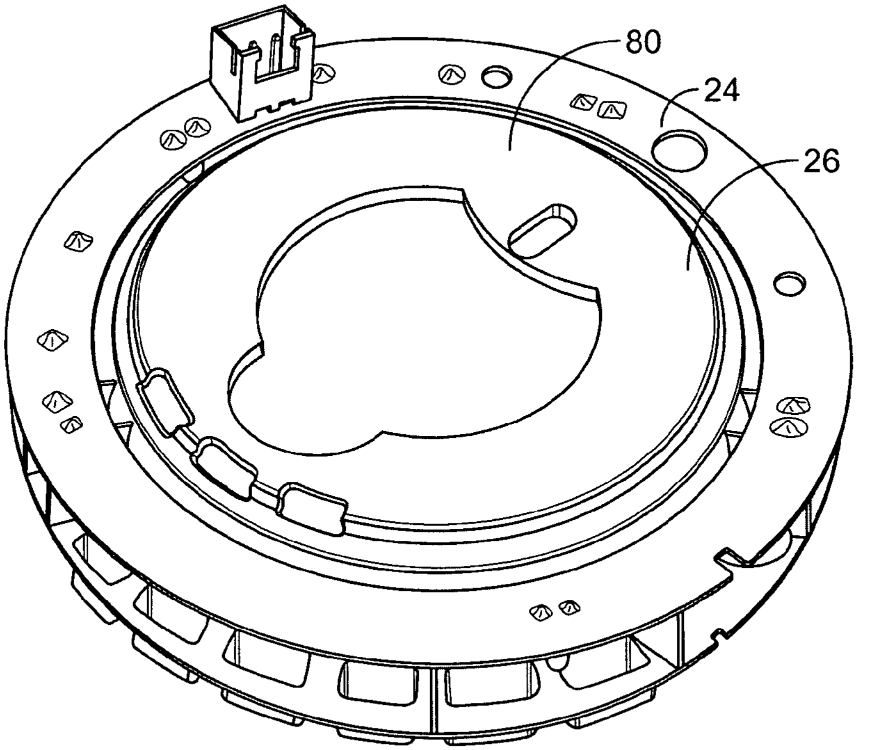
FIG. 7 illustrates a bottom perspective view of the PC board and light-transmitting plate fitted together.
Figure 8:
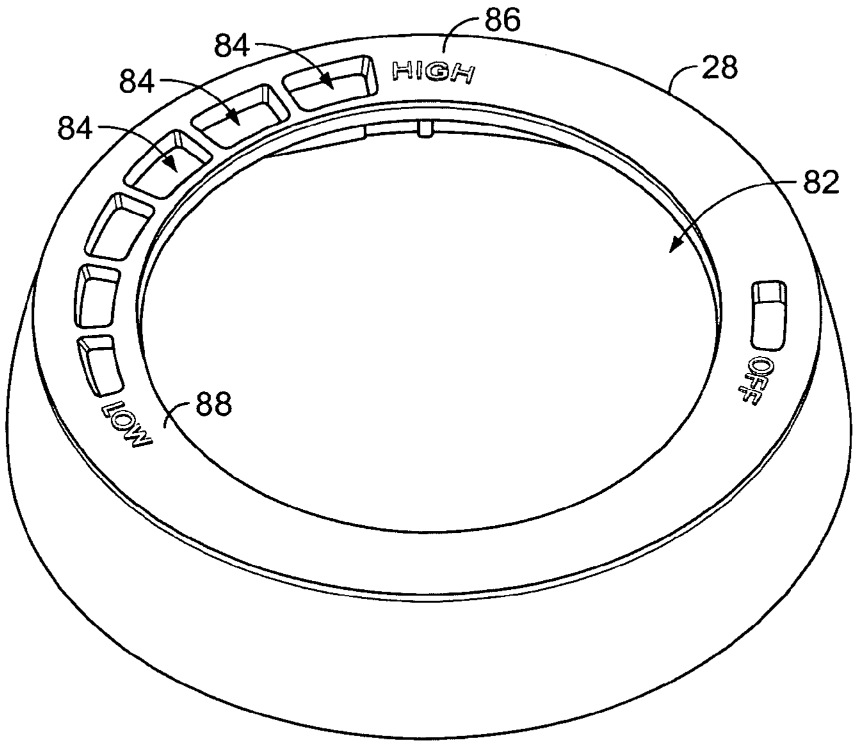
FIG. 8 illustrates a top perspective view of a bezel of the illuminated control knob of FIG. 1.

FIG. 7 shows the PC board 24 in a position relative to the underside 80 of plate 26. FIG. 8 shows the bezel 28, which may be a frustoconical shape with a bezel opening 82 sized and shaped to receive knob 30 (see FIG. 1). Spaced through the bezel 28 is a plurality of gradated bezel openings 84 positioned, sized and shaped to receive the graduated protrusions 74 (see FIG. 5) of plate 26. High and low markings 86, 88 are provided on the bezel 28 to indicate a range of adjustments gradating from high to low. Preferably, the size of the openings 84 gradate and correspond to high to low settings of a flow valve of a barbeque, or the like (not shown). An opening 88 is provided to receive the single protrusion 72, which is positioned, sized and shaped to receive the single protrusion at a point indicating that a valve (not shown) to which the assembly 20 (See FIG. 11) is attached is in an off position or condition.

Figure 9:
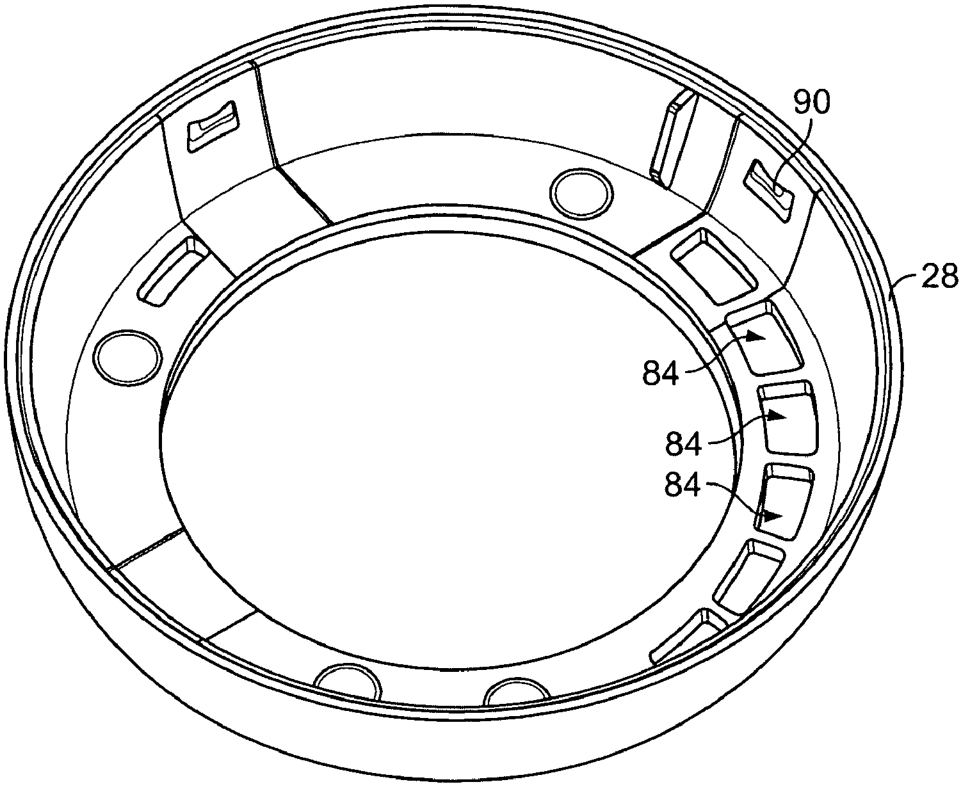
FIG. 9 illustrates a bottom perspective view of the bezel of FIG. 8.

FIG. 9 illustrates the indents 90 of the bezel 28, which are sized and shaped to receive the base hooks 46 of the base 22 (see FIG. 2) when the assembly 32 is fastened together with the PC board 24 and plate 26 in between and properly oriented.

Figure 10:
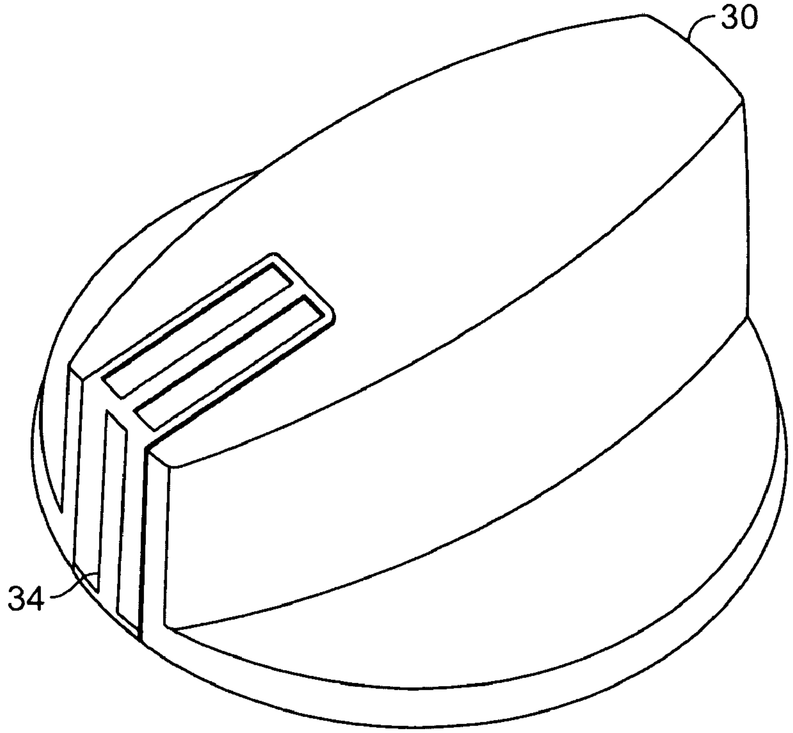
FIG. 10 illustrates a top perspective view of a knob and pointer assembly of the illuminated control knob of FIG. 1.

FIG. 10 shows the knob 30 including a light-transmitting pointer 34, which permits light from the light sources 54 (see FIG. 3) to indicate the position of the knob. The pointer may be made of a transparent or translucent clear or colored material 92.

Figure 11:
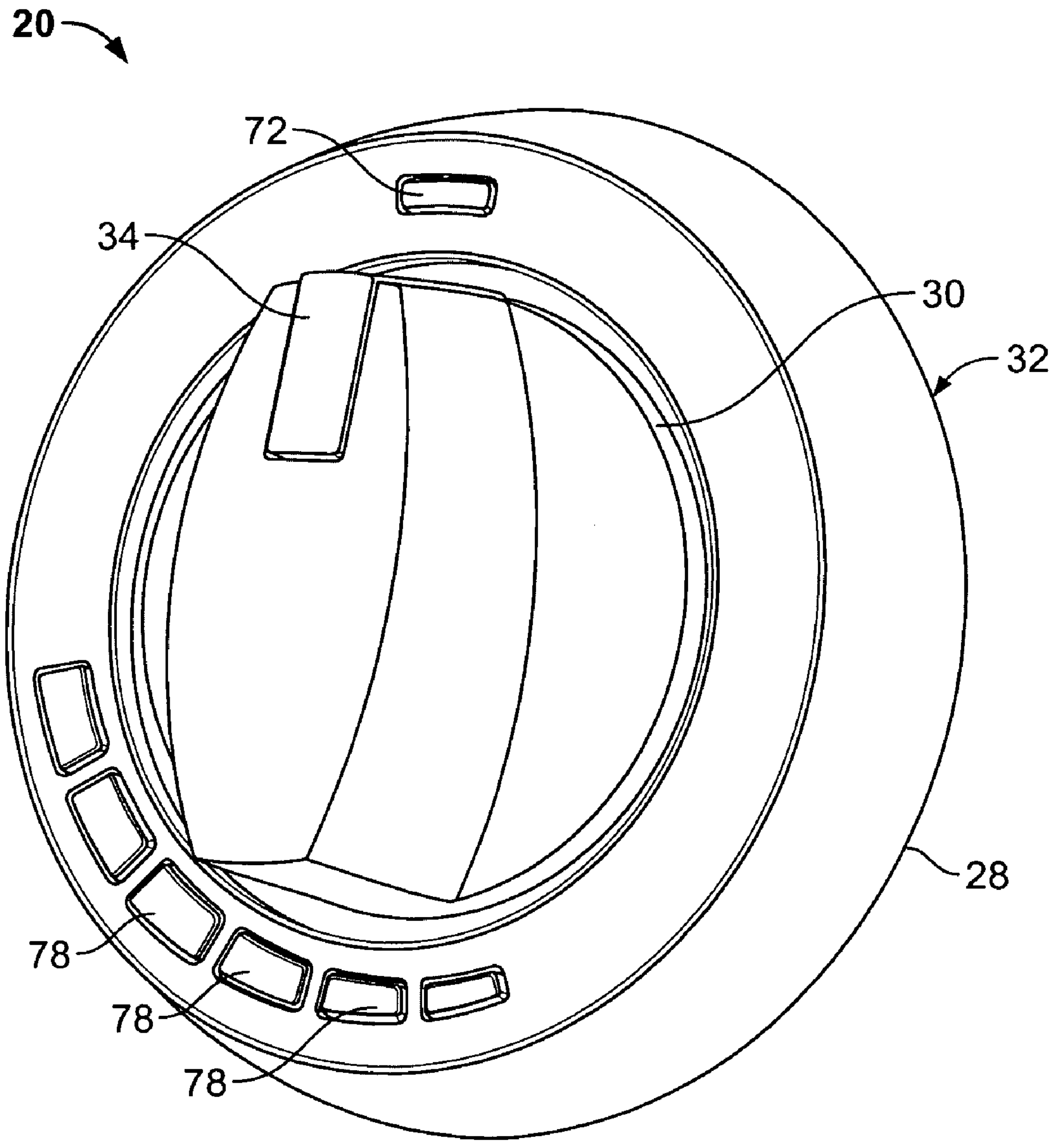
FIG. 11 illustrates an embodiment of an assembled illuminated control knob according to the invention.

FIG. 11 shows assembly 20 with dial 32 and knob 30 being in position in the dial. The knob 30 includes light-transmitting pointer 34. The bezel portion 28 of the dial 32 includes single protrusion 72 positioned through the bezel 28 to point to, identify or indicate an "off" position (gas valve closed) and the set of graduated protrusions 74 positioned through the bezel at positions corresponding to varying rates of gas flow, i.e., low, medium and high, and so on.

Whilst the above-described assembly is intended, in one embodiment to be used with a barbeque, it is to be realized that the assembly illustrated and described herein could be incorporated in other apparati with similar or equivalent benefits for illuminating any desired operation area.

Whilst endeavoring in the foregoing specification to draw attention to those features of the invention believed to be of particular importance it should be understood that the Applicants claim protection in respect of any patentable feature or combination of features hereinbefore referred to and/or shown in the drawings whether or not particular emphasis has been placed thereon. While the apparatus and method herein disclosed forms a preferred embodiment of this invention, this invention is not limited to that specific apparatus and method, and changes can be made therein without departing from the scope of this invention, which is defined in the appended claims.

What is claimed is:

1. An illuminated knob assembly, comprising:

a base, said base including an annular track on an upper base surface thereof;

a PC board disposed in said annular track, said PC board including one or more light sources disposed on an upper board surface thereof;

a light transmitting plate positioned over said PC board so as to transmit light therethrough from said one or more light sources;

a bezel fitted over said light transmitting plate and including gradated openings corresponding to different conditions of operation, said openings permitting light to pass therethrough from said light transmitting plate; and a knob disposed adjacent said bezel; said knob including a light pointer configured to receive and transmit the light from said one or more light source.

2. The assembly of claim 1, wherein said base is a flat ring shape.

3. The assembly of claim 2, wherein said base includes an inner wall at an inner periphery thereof and an outer wall at an outer periphery thereof.

4. The assembly of claim 3, wherein said PC board is shaped and sized to fit on said track between said inner wall and said outer wall.

5. The assembly of claim 1, further including a plurality of spaced stand off elements disposed in said track to separate said PC board from said base.

6. The assembly of claim 1, further including a plurality of spaced base hooks, each of said plurality of spaced base hooks being shaped and sized to engage a corresponding indent formed on an inside of said bezel.

7. The assembly of claim 1, further including a base alignment pin for orienting said PC board.

8. The assembly of claim 7, wherein said PC board further includes a base alignment opening which cooperates with said base alignment pin to orient said PC board on said base.

9. The assembly of claim 1, further including an access port formed through said track portion of said base.

10. The assembly of claim 1, wherein said one or more light sources is one or more light emitting diodes.

11. The assembly of claim 1, further including a pair of cap alignment holes formed through said PC board for orienting said light transmitting plate thereon.

12. The assembly of claim 1, wherein said light transmitting plate includes a generally cylindrical portion with an outwardly extending flange extending from said cylindrical portion.

13. The assembly of claim 12, wherein said outwardly extending flange includes a plurality of protrusions.

14. The assembly of claim 13, wherein said plurality of protrusions are gradated.

15. The assembly of claim 14, wherein said plurality of protrusions are gradated and correspond to indicate different settings of said knob assembly.

16. The assembly of claim 15, wherein said outwardly extending flange further includes a single protrusion which corresponds to an off position of said knob.

17. The assembly of claim 16, wherein said bezel includes bezel openings sized and shaped to receive said plurality of protrusions and said single protrusion.

18. The assembly of claim 1, wherein said bezel includes a central opening sized and shaped to receive said knob.

19. The assembly of claim 1, wherein said light transmitting plate and said light pointer are adapted to be in communication with said one or more light source.

* * * * *